July 27, 1954 W. V. BROWN 2,684,683
SAFETY CLOSURE FOR TRUCK AND TRAILER TANK BODIES
Filed Nov. 5, 1952 3 Sheets-Sheet 1
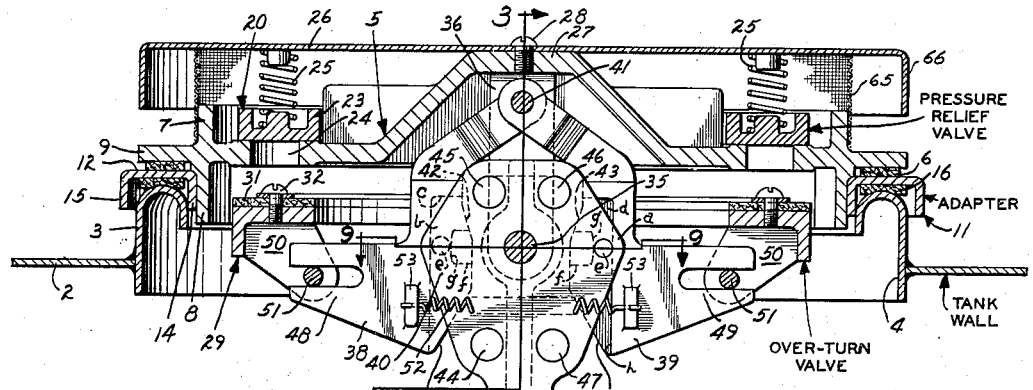
FIG. 1
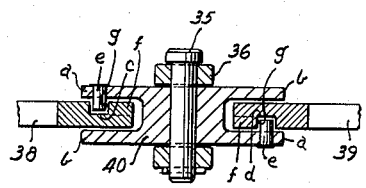
FIG. 9
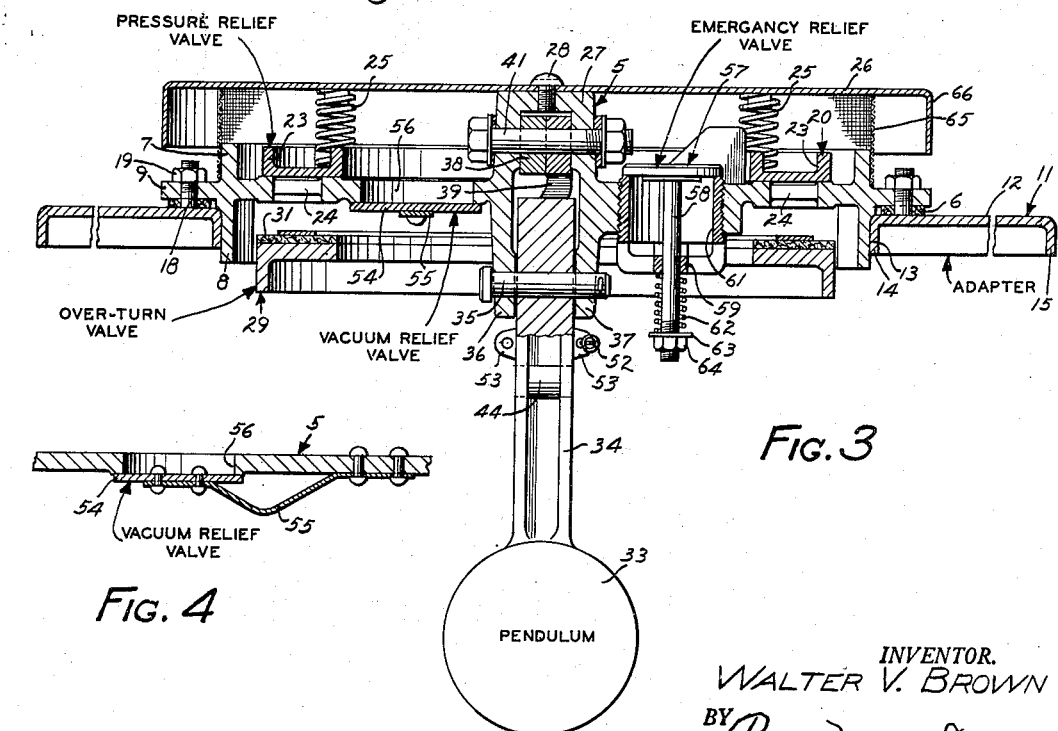
INVENTOR.
WALTER V. BROWN
BY
ATTORNEY.

July 27, 1954          W. V. BROWN          2,684,683

SAFETY CLOSURE FOR TRUCK AND TRAILER TANK BODIES

Filed Nov. 5, 1952          3 Sheets-Sheet 2

INVENTOR.
WALTER V. BROWN
BY
ATTORNEYS

July 27, 1954     W. V. BROWN     2,684,683
SAFETY CLOSURE FOR TRUCK AND TRAILER TANK BODIES
Filed Nov. 5, 1952     3 Sheets-Sheet 3
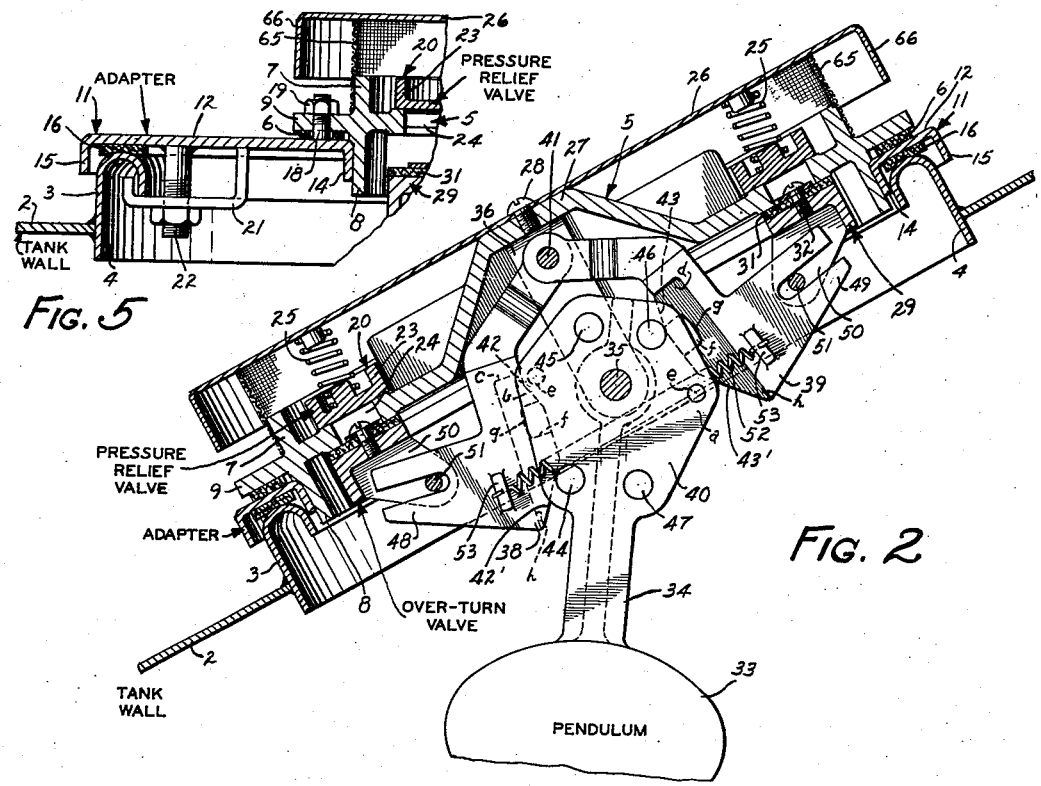
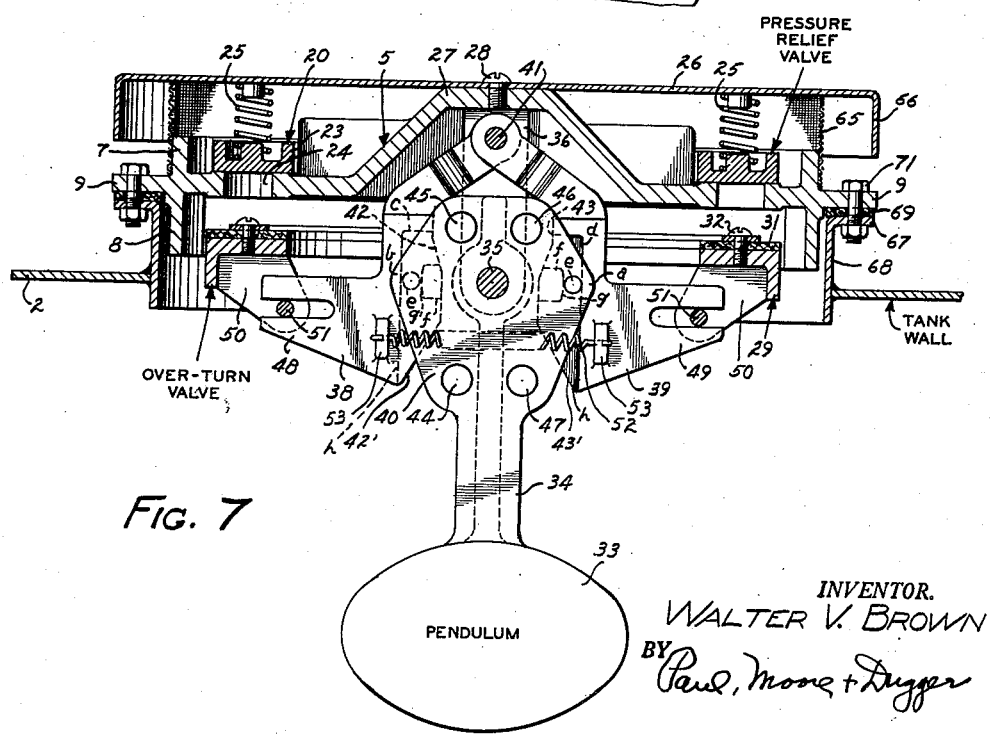
INVENTOR.
WALTER V. BROWN
ATTORNEYS Patented July 27, 1954

2,684,683

UNITED STATES PATENT OFFICE 2,684,683

SAFETY CLOSURE FOR TRUCK AND TRAILER TANK BODIES

Walter V. Brown, Minneapolis, Minn., assignor to Brown Steel Tank Company, Minneapolis, Minn., a corporation of Minnesota Application November 5, 1952, Serial No. 318,876

20 Claims. (Cl. 137—43)

1

This invention relates to new and useful improvements in safety closures for truck and trailer tank bodies such as commonly utilized for transporting gasoline and other volatile liquids or fluids from one place to another, and more particularly to such closures used on tanks designed for bottom loading.

The novel safety closure herein disclosed was developed primarily for use in connection with large truck and trailer tank bodies wherein the various compartments of the tank body are filled from their bottoms, through the same lines or conduits used for draining or pumping the liquids therefrom.

An important object of the invention is to provide such a safety closure comprising a plurality of valve mechanisms designed to perform four separate and distinct functions, namely: (a) to automatically release excessive internal pressure from the various liquid compartments of the tank body; (b) to prevent the formation of a vacuum within the compartments of the tank; (c) to prevent spillage of the liquid from the tank compartments in the event the tank body should list severely to one side or is overturned; and (d) to prevent the development of dangerously high pressures within the tank compartments, which might result in serious damage to the equipment.

A further object of the invention resides in the specific construction of the closure and its various valve mechanisms, which may operate independently of one another to automatically perform their various functions without failure, and whereby truck and trailer tanks equipped with the safety closure herein disclosed may be operated with extreme safety at all times.

Other objects of the invention reside in the unique construction and operation of the over-turn valve ring which is actuated by a pendulum normally supported in a position to retain the over-turn valve ring in open position, said pendulum being adapted, upon listing of the tank body to either side beyond a pre-determined angle, to automatically close the over-turn valves of the various tank compartments, and thus prevent spillage of liquid from said compartments, should the tank body list severely to either side; in the cam means provided for transmitting movement from the pendulum to the annular over-turn valve ring, whereby said valve ring is always retained in parallel relation to its seat when moved into open position, thereby instantly effecting full opening of the valve when actuated to release pressure from the tank compartments; in the means provided for positively preventing the

2 over-turn valve from accidentally closing from any cause whatsoever, so long as the pendulum is suspended in its normal position with its shank disposed at substantially right-angular relation to the plane of the over-turn valve; and in the specific construction of the various other valve mechanisms whereby said mechanisms are wholly automatic in operation and are highly responsive to pressure fluctuations within the tank compartments.

Other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a vertical sectional view on the line 1—1 of Figure 6 showing the various valve mechanisms in their normal positions;

Figure 2 is a view similar to Figure 1, but showing the pendulum actuated to close the over-turn valve, as when the tank body is laterally tilted beyond a pre-determined safe operating angle;

Figure 3 is a vertical sectional view on the line 3—3 of Figure 1;

Figure 4 is a fragmentary detail sectional view on the line 4—4 of Figure 6, showing the vacuum relief valve in its normal closed position;

Figure 5 is a detail sectional view on the line 5—5 of Figure 6, showing the means provided for securing the closure in position on the usual collar of the manhole opening in the tank body;

Figure 7 is a vertical sectional view similar to Figure 1, but showing the safety closure mounted upon and secured to a relatively smaller cylindrical collar of a tank body;

Figure 9 is a detail sectional view on the line 9—9 of Figure 1.

Figure 6:
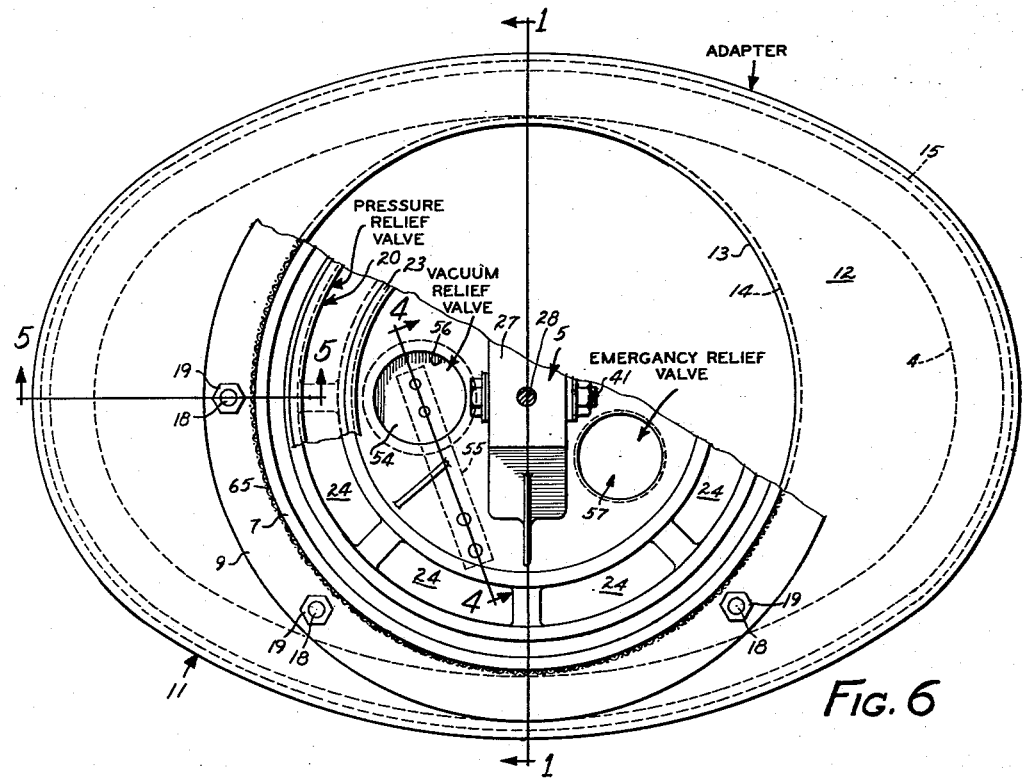
Figure 6 is a plan view of Figure 1.

In the selected embodiment of the invention herein disclosed, there is illustrated in Figures 1 and 2, a portion of the top wall 2 of a conventional tank or trailer body of the general type employed for transporting highly inflammable liquids such as gasoline, fuel oil, and other gaseous liquids or fluids. In the form shown in Figures 1, 2 and 5, the tank wall 2 is shown provided with an annular collar 3 which, in the case of a manhole, is usually oval in configuration, as illustrated in Figure 6, to provide a conventional manhole 4 through which an individual may readily enter the tank compartment, when necessary, by removal of the closure from the opening 4, as will readily be understood by reference to Figure 6.

*Closure body member*

The novel safety closure herein disclosed is shown comprising a plate-like body member, generally designated by the numeral 5, provided adjacent to its outer marginal edge with an upright cylindrical wall portion or flange 7, and a depending cylindrical wall portion or flange 8, clearly illustrated in Figures 1 and 3. The horizontally disposed annular marginal edge portion 9 of the body member 5 is adapted to be seated upon a suitable gasket or sealing ring 6, when the closure is secured in position on the tank body, as will subsequently be described.

When the safety closure is to be utilized for closing a manhole 4, such as illustrated in Figures 1 to 6, inclusive, an adapter, generally designated by the numeral 11, is employed, as best illustrated in Figures 2, 3 and 6. The adapter 11 is shown comprising a horizontal wall portion 12 having a circular opening 13 therein adapted to receive the depending annular flange 8 of the body member 5 of the closure, thereby to properly position the closure on the adapter. The opening 13 in the adapter is bounded by a depending annular reinforcing flange 14, and a similar depending annular flange 15 is provided at the periphery of the adapter which overhangs the upper portion of the collar 3, as clearly illustrated in Figures 1 and 2. A suitable gasket 16 is shown inserted between the upper convex edge of the collar 3 and the adapter 11 to prevent leakage therebetween.

The annular flange 9 is secured to the adapter 11 by suitable studs 18, shown having their lower ends fixedly secured to the horizontal wall 12 of the adapter 11, by such means as welding. The studs 18 are received in suitable apertures provided in the flange 9, and nuts 19 are received in threaded engagement with the studs 18 to secure the closure to the adapter 11 in leak-tight relation, as will be understood by reference to Figure 5. The adapter, in turn, may be detachably secured to the collar 3 of the tank body by such means as U-shaped clamping elements 21 and studs 22.

*Pressure relief valve*

Means is provided for automatically releasing internal pressures from the tank compartments, resulting from bottom filling, or from other causes, thereby to protect the tank against damage from such pressures. Such means resides in the provision of a pressure relief valve, generally designated by the numeral 20, shown comprising an annular ring or valve member 23, adapted normally to close a plurality of pressure relief ports 24, provided in the horizontal wall portion of the body member 5, as shown in Figures 1, 2, 3 and 7. Suitable springs 25 are shown having their lower ends seated on the valve ring or member 23, and their upper ends are engaged with a cover plate 26, having its central portion detachably secured to the raised central portion 27 of the body member 5, by such means as a screw 28. The springs 25 normally retain the pressure relief valve or ring 23 in engagement with its seat on the body member 5, as shown in the application drawings.

Figure 8:
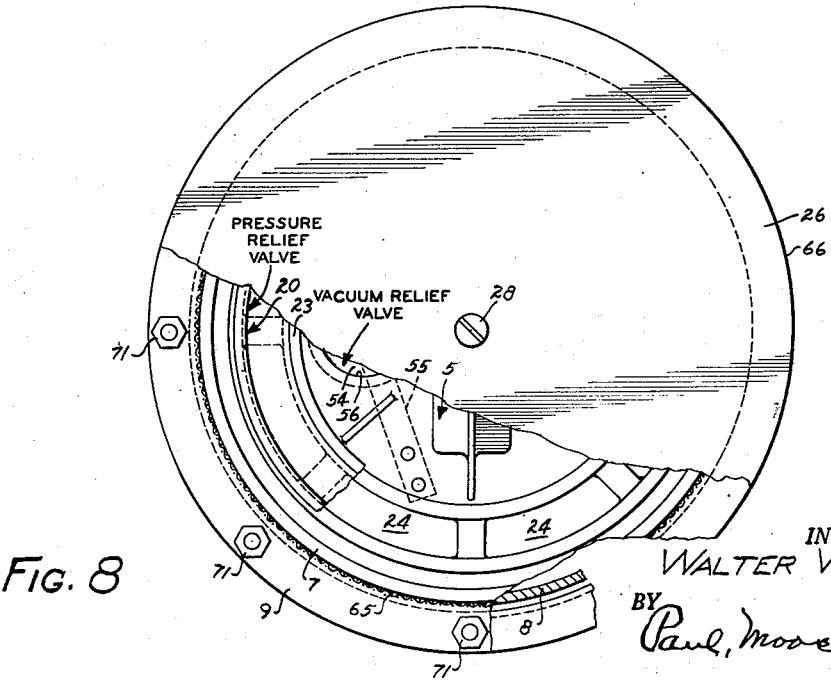
Figure 8 is a top view of Figure 7.

The pressure relief ports 24 are preferably segmental in configuration, as best shown in Figures 6 and 8, to provide enlarged openings for the escape of internal pressures which may tend to develop within the tank compartments, when they are quickly filled from their bottoms. The pressure relief valve also functions to permit escape of liquid from the tank without damaging the tank, should the operator inadvertently fail to shut off the flow of liquid to one of the tank compartments, when the latter has received its full charge.

*Over-turn valve*

Means is also provided for preventing spillage or over-flowing of the contents of the tank compartments, should the tank body laterally list to either side beyond a predetermined angle, or in the event it is over-turned. Such means is shown comprising an annular valve ring, generally designated by the numeral 29, having a suitable gasket 31 secured to its upper surface by such means as screws 32. The valve ring 29 registers with the pressure relief ports 24 in the body member 5, and is adapted to close said ports under certain conditions, as will subsequently be described.

The over-turn valve 29 is normally in open position, as shown in Figure 1, and is adapted to be moved into closing engagement with the pressure relief ports 24 to prevent liquid flow therethrough. The means provided for thus moving the over-turn valve 29 into closing engagement with the pressure relief ports 24, is shown comprising a pendulum 33, having a shank 34 pivotally mounted upon a pivot pin 35, supported by a pair of spaced depending lugs 36 and 37, which may be integrally formed with the horizontal wall of the body member 5, as best illustrated in Figure 3. It will thus be noted that the pendulum is adapted for swinging movement in a plane transverse to the longitudinal center line of the tank body, whereby listing of the tank body to either side will cause the pendulum to relatively swing about the axis of the pivot pin 35. Such relative swinging movement of the pendulum 33 may effect actuation of the over-turn valve ring 29 because of its operative connection with the pendulum 33, should the tank list excessively to either side.

To thus actuate the over-turn valve ring 29, opposed operating members 38 and 39, of like construction, are shown pivotally mounted on a pin 41 supported in the upright central portion 27 of the body member 5, as clearly illustrated in Figures 1 and 3. The pivot pin 41 is preferably in the form of a conventional bolt, whereby it may be detachably secured in the upright central portion 27 of the body member 5, as will be understood by reference to Figure 3.

The operating member 38 is shown provided with inwardly facing upper and lower cam edges 42 and 42', respectively, and the operating member 39 is provided with similar upper and lower cam edges 43 and 43'. These cam edges are adapted to be engaged by a plurality of pins 44, 45, 46 and 47, carried by the upper portion or head 40 of the shank 34 of the pendulum, as clearly illustrated in the application drawings. The opposed vertical side portions of the head 40 of the pendulum shank are forked or recessed to provide spaced parallel flanges *a* and *b* adapted to receive therebetween the adjacent edge portions of the operating members 38 and 39, as clearly illustrated in Figure 9.

Each operating member 38 and 39 is provided with an elongated vertically disposed recess or groove in a side face thereof, indicated by the reference characters c and d, respectively, adapted to receive a pair of opposed pins e carried by the flanges a of the shank head 40. An abutment lug f is provided in each recess c and d, as indicated in dotted lines in Figures 1, 2 and 7. The outer faces g of the lugs f are slightly curved, as indicated, and are spaced from the vertical walls h of the recesses to provide passages for the pins e to pass through during swinging movement of the pendulum, as will be clearly understood by reference to Figures 1 and 2.

The pins e cooperate with the walls g and h of the recesses or grooves c and d to lock the overturn valve ring 29 in its normal open position, as shown in Figure 1, when the pendulum is in its normal position, as shown in this figure. In other words, the pins e function to prevent accidental closing of the overturn valve ring 29 from any cause, whatsoever, so long as the pendulum is in its normal position with its shank 34 disposed substantially perpendicular to the plane of the valve ring 29. When the truck body or tank tilts to one side, as indicated in Figure 2, the pins 44 and 46 engage the cam faces 42' and 43, respectively, and thereby actuate the operating members 38 and 39 to close the overturn valve 29, as clearly illustrated in Figure 2.

It will thus be noted that the pins e function only when the pendulum is disposed in perpendicular relation to the valve ring 29, whereby the operating arms 38 and 39 are locked against pivotal movement, as will readily be understood by reference to Figure 1.

The outer ends of the operating members 38 and 39 are provided with forked terminals 48 and 49, respectively, which are constantly engaged with a pair of pins 51, mounted in spaced ears or lugs 50, depending from the annular overturn valve ring 29, as clearly illustrated in Figures 1, 2 and 7. A suitable spring 52 is shown having its ends secured to lugs 53 provided on the operating members 38 and 39, and is normally under tension to retain the operating members 38 and 39 in their normal retracted positions, as shown in Figure 1.

Thus, by the provision of the cam edges 42, 42', 43 and 43' of the operating members 38 and 39 in conjunction with the pins 44, 45, 46 and 47 of the pendulum, when the pendulum swings from its vertical position, shown in Figure 1, to an angular position relative to the top wall 2 of the tank body, as shown in Figure 2, as a result of the tank body listing to one side, the overturn valve is moved into closing engagement with the pressure relief ports 24 in the body member 5, thereby to prevent liquid flow therethrough, as will be understood by reference to Figure 2. The unique arrangement of the pins 44, 45, 46 and 47 relative to the cam edges 42, 42', 43 and 43' is such that the over-turn valve ring 29 is always maintained substantially parallel to its seat on the body member 5.

When the tank body returns to its normal horizontal position, the pendulum is returned to its normal position and thus returns the over-turn valve ring 29 to its normal open position, shown in Figure 1. If desired, the pins 44, 45, 46 and 47, carried by the head 40 of the pendulum 33 may be dispensed with, and in lieu thereof the shank 34 of the pendulum may be formed with integral projections adapted to engage the cam edges to effect operation of the operating members 38 and 39, as hereinbefore described. From the foregoing, it will be noted that the pressure relief valve 20 and the over-turn valve 29 utilize the same pressure relief ports 24.

Vacuum relief valve

Means is also provided for preventing the formation of a vacuum within the tank which may be caused when liquid is pumped or drained from the tank, or by a sudden drop in the temperature of the atmosphere. Such means is best illustrated in Figures 4 and 6, and comprises a valve element 54 shown secured to a resilient arm 55 having one end fixed to the horizontal plate portion of the body member 5, as best illustrated in Figure 4. The valve element 54 normally closes an opening 56 provided in the body member 5 to prevent liquid from passing therethrough under normal conditions.

When liquid is pumped from the tank a vacuum may form within the tank whereupon the vacuum relief valve 54 is automatically opened by a drop in the pressure within the tank below that of atmospheric pressure, whereupon the valve 54 opens and permits air to enter the tank and equalize the pressures.

Emergency pressure relief valve

Means is also provided for releasing dangerously high pressures from the tank compartments in the event the tank is overturned, because when the tank is so positioned, the over-turn valve 29 is closed by the action of the pendulum, whereby the over-turn valve cannot function to release pressure from the tank. To assure the release of such excessive internal pressures from the tank, an emergency valve, generally designated by the numeral 57, is mounted in the body member 5, as best illustrated in Figure 3.

The emergency valve 57 has a stem 58 which is slidably supported in a guide 59 constituting a portion of a sleeve-like valve cage 61, shown received in threaded engagement with the body member 5, whereby the valve 57 and valve cage or housing 61 may be removed from the member 5 as a unit. A spring 62 is shown coiled about the stem 58 and has one end seated against the guide 59 and its opposite end against a washer 63 backed by a nut 64 received in threaded engagement with the end of the valve stem. The spring 62 has sufficient tension to support the weight of the liquid within the tank, when the latter is in an over-turned position.

The tension of the spring, however, is such that should an excessive pressure develop within the tank when the tank is in an inverted position, the emergency pressure relief valve 57 will automatically open and release a portion of the liquid from the tank, as will readily be understood by reference to Figure 3. In the drawings, but one emergency valve is shown. It is to be understood, however, that two or more such valves may be utilized if necessary, to provide the necessary emergency venting area required by law, which is a variable factor because of the varying sizes of tank compartments. Two or more vacuum relief valves 54 may also be utilized, if deemed necessary in the operation of the apparatus.

A fire screen 65 is shown interposed between the cover plate 26 and the marginal edge portion 9 of the body member 5 and is retained in position thereon by the upright annular flange 7 of the body member, as clearly illustrated in Figures 1, 2, 3 and 7. The fire screen thus cooperates with the cover plate 26 to completely enclose the various valve mechanisms of the closure, the lower portion thereof being exposed to view below the lower edge of the depending annular flange 66 of the cover plate 26.

In Figures 7 and 8, there is illustrated a slightly modified tank construction wherein the fuel or vent opening in the tank compartment is circular in configuration and not oval, as the manhole 4 illustrated in the preceding figures. In such an installation, the adapter plate 12 is dispensed with and the annular flange 9 of the body member 5 is seated upon an annular flange 67 which constitutes the upper portion of the usual collar 68 of the fill opening of the tank. A suitable gasket or sealing element 69 is interposed between the flanges 9 and 67, and the parts are secured together by a plurality of bolts 71, shown in Figure 7.

The novel safety closure herein disclosed has been found to provide the utmost in safety in tank trucks and trailers of this general type, as it positively prevents the development of excess pressures within the tank compartments, and also eliminates the formation of a vacuum therein. In addition, it automatically prevents spillage of liquid from the tank compartments in the event the tank body should list to a predetermined angle in a sidewise direction. Under such conditions the over-turn valve 29 is automatically moved into closing engagement with the pressure relief ports 24 by the action of the pendulum 33, and the valve 29 will remain in closed position so long as the tank body remains in such tilted position or is over-turned. The springs 25 which normally hold the pressure relief valve 20 in its closed position, as shown in Figure 1, are so tensioned that under all normal operating conditions the valve 20 is retained in closed position. Should an excess pressure, however, develop within the tank as a result of the bottom loading of the compartments therein, the springs 25 will yield to the pressure of the liquid within the tank body and thus permit the valve 20 to open to automatically release such pressure.

Conversely, should a vacuum develop within the tank, as a result of liquid being pumped or drained therefrom, the vacuum relief valve 54 automatically becomes operative and permits atmospheric air to enter the tank compartments to equalize the pressures therein.

The foregoing detailed description has been given for clearness of understanding only, and no unnecessary limitations should be understood therefrom, but the appended claims should be construed as broadly as permissible in view of the prior art.

What I claim is:

1. A safety closure for truck tanks and trailer bodies comprising an upright collar adapted to be secured to a wall of a tank body to define an opening therein, said collar having an annular seat at its upper end, a closure for said opening including a plate-like body member engageable with said seat to close the opening, means for securing the closure in position on said seat, said plate-like body member comprising a horizontal annular wall portion having a plurality of pressure relief ports therein a pressure relief valve mounted exteriorly of said annular wall portion and normally closing said ports, said valve being responsive to pressure variations within the tank body to automatically release excessive internal pressures from the tank body caused by bottom filling or from other causes, a normally open over-turn valve carried by said body member within the tank, and gravity-operated means connected to said over-turn valve adapted to automatically close said valve, should the tank accidentally overturn or laterally list beyond a predetermined angle.

2. A safety closure according to claim 1, wherein said gravity-operated means comprises a pendulum mounted for swinging movement transversely of the truck body and having link means operatively connecting it to the overturn valve.

3. A safety closure according to claim 1, wherein means is provided for preventing the formation of a vacuum within the tank body when draining liquid therefrom.

4. A safety closure according to claim 3, wherein the means provided for preventing the formation of a vacuum within the tank comprises a normally closed disk valve mounted on the bottom side of the body member.

5. A safety closure for truck tanks and trailer bodies comprising an upright collar adapted to be secured to a wall of a tank body to define a vent opening therein, said collar having an annular seat at its upper end, a closure for said opening including a plate-like body member engageable with said seat to close the opening, means for securing the closure in position on said seat, said body member having a series of pressure relief ports therein and having opposed annular seats at the outer and inner ends of said ports, and an annular pressure relief valve mounted on said member and normally engaging the seat at the outer ends of said ports and closing them to fluid flow under normal operating conditions, said valve being responsive to pressure variations within the tank body to automatically release excessive internal pressure therefrom caused by bottom filling or from other causes, an over-turn valve engageable with the seat at the inner ends of said ports, and gravity-operated means connected to said over-turn valve and normally retaining it in open position and adapted, upon listing of the tank body to either side, to automatically move said over-turn valve into closing engagement with said inner seat to close said relief ports to prevent spillage of liquid from the tank through said ports, should the tank accidentally overturn or laterally list beyond a predetermined angle.

6. A safety closure according to claim 5, wherein the pressure relief valve is mounted on top of the plate-like body member directly over said pressure relief ports, and the over-turn valve is mounted on the bottom of said body member directly below said ports.

7. A safety closure for truck tanks and trailer bodies comprising an upright collar adapted to be secured to a wall of a tank body to define a vent opening therein, said collar having an annular seat at its upper end, a closure for said opening including a plate-like body member engageable with said seat to close the opening, means for securing the closure in position on said seat, a plurality of pressure relief ports disposed in an enlarged axial circle in said body member, an annular pressure relief valve mounted on the outer side of said body member and normally closing said pressure relief ports, said valve member being responsive to pressure variations within the tank body to automatically release excessive internal pressure from the tank body caused by bottom filling or from other causes, an over-turn valve ring carried by said body member and engageable with said pressure relief ports from the interior side of said body member, and a pendulum connected to said over-turn valve ring and normally retaining it in open position, said pendulum being adapted to move said overturn valve ring into closing engagement with said pressure relief ports to automatically close said ports, should the tank accidentally overturn or laterally list beyond a predetermined angle.

8. A safety closure according to claim 7, wherein opposed links operatively connect the pendulum to the overturn valve ring and have cam means for imparting axial movement to said valve ring.

9. A safety closure according to claim 8, wherein means is provided for preventing the formation of a vacuum within the tank body, when draining liquid from the tank.

10. A safety closure for truck tanks and trailer bodies comprising an upright collar adapted to be secured to a wall of a tank body to define a vent opening therein, said collar having an annular seat at its upper end, a closure for said opening including a plate-like body member engageable with said seat to close the opening, means for securing the closure in position on said seat, said body member comprising an annular horizontal wall portion having a plurality of pressure relief ports therein, and having opposed annular seats at the outer and inner ends of said ports, an annular pressure relief valve mounted on said body member exteriorly of said horizontal wall portion and engageable with said outer seat to normally close said ports, said valve being responsive to pressure variations within the tank body to automatically release excessive internal pressure from the tank body caused by bottom filling or from other causes, a normally open over-turn valve also carried by said body member within the tank, means for automatically moving the over-turn valve into engagement with the annular seat at the inner ends of said ports to close said ports against fluid flow, should the tank accidentally overturn or laterally list beyond a predetermined angle, and an emergency pressure relief valve operable independently of said pressure relief and over-turn valves to automatically release excessively high internal pressures from the tank body, in the event the tank body is overturned and said annular pressure relief valve is rendered inoperative as a result of the over-turn valve closing said pressure relief ports.

11. A safety closure according to claim 10, wherein the emergency pressure relief valve is normally retained in closed position by spring means having sufficient strength to support the weight of the liquid within the tank body when the tank is overturned, and spring means being adapted to yield and permit said emergency valve to open to release pressure from the tank, should an excessively high pressure develop within the tank body and the over-turn valve is closed.

12. A safety closure for truck tanks and trailer bodies comprising an upright collar adapted to be secured to a wall of a tank body to define a vent opening therein, said collar having an annular seat at its upper end, a closure for said opening including a plate-like body member engageable with said seat to close said opening, means for securing the closure in leaktight engagement with said seat, a plurality of pressure relief ports in said body member, an annular pressure relief valve mounted on the outer side of said body member and normally closing said ports, said valve being responsive to pressure variations within the tank body to automatically release excessive internal pressure from the tank body from any cause, a normally open over-turn valve carried by said body member and engageable with said pressure relief port from the interior side of said body member, a pendulum mounted for lateral pivotal movement on said body member about a horizontal pivot, a pair of links pivoted at their upper ends to a common pivot supported in said body member, said links having oppositely disposed terminal portions having sliding connections with means on said over-turn valve, and cam means on said links adjacent to the pendulum adapted to be engaged by means on the pendulum to actuate said links and move the over-turn valve into closing engagement with said pressure relief ports, by relative swinging movement of the pendulum caused by the tank body over-turning or tilting to one side.

13. A safety closure according to claim 12, wherein the cam engaging means on the pendulum will effect like movements of said links, thereby to cause the over-turn valve to be moved in an axial direction, when moved into or out of engagement with its seat by the pendulum.

14. A safety closure according to claim 13, wherein the pendulum has an elongated shank which is apertured to receive said horizontal pivot, said pivot being spaced downwardly from the upper end of the shank, and the cam-engaging means carried by the shank being located above and below said horizontal pivot whereby when the pendulum is operated by tilting movement of the tank body, the cam-engaging means on said shank will engage the cam means on said links and simultaneously actuate said links to move said over-turn valve into closing engagement with the pressure relief ports to prevent spillage of liquid fuel therefrom.

15. A safety closure for a truck tank or trailer body having means in its upper wall providing a combined manhole and vent opening having an annular seat, a closure for said opening, including a plate-like body member engageable with said seat to close the opening, means for securing the closure in sealtight engagement with said seat, a normally closed pressure relief valve in said body adapted to release internal pressure from the tank body, a normally open over-turn valve, a pendulum for positively closing said over-turn valve when the tank lists laterally beyond a predetermined angle, or in the event the tank is overturned, a normally closed emergency relief valve in said body member operable to automatically release excessive internal pressures from the tank body in the event such pressure exceeds the weight of the liquid in the tank, when the tank is over-turned, and a vacuum relief valve for preventing the formation of a vacuum in the tank when liquid is drained therefrom, all of said valves being adapted to function automatically and independently of one another under certain operating conditions.

16. A safety closure for a truck or trailer body having a circular opening in its upper wall portion, a closure for said opening including a plate-like body member having means for securing it in closed position over said opening to prevent fluid leakage therefrom, a plurality of valve openings in said member, an annular valve element for simultaneously closing said valve openings, weighted means normally retaining said valve element in open position and adapted upon lateral tilting of the truck body to a predetermined angle to either side to actuate said valve element and automatically close said valve openings and means embodied in said valve actuating means for preventing closing of the valve element by a sudden rush of liquid into the tank.

17. A safety closure according to claim 16, wherein said valve operating means is in the form of a pendulum pivoted at one end to said closure body member and having link means operatively connecting it to the valve element, and interengaging means on said pendulum and link means for preventing said valve element from being moved into closing engagement with said valve opening from any cause without swinging movement of the pendulum.

18. A safety closure for a truck tank or trailer body having an opening in its upper wall portion, a closure for said opening including a plate-like body member having means for securing it in position over said opening to prevent fluid leakage therefrom, a valve opening in said member, an annular valve element for closing said valve opening, a pendulum pivoted at one end to said closure body member, opposed operating members pivotally mounted on said closure body member and having their oppositely disposed terminals operatively connected to said annular valve element, and a plurality of cam faces on said operating members positioned to be engaged by means on the pendulum, whereby when the pendulum is swung to either side from its normal position, said operating members are actuated to axially translate said valve element into closing engagement with said valve opening.

19. A safety closure according to claim 18, wherein interlocking means is provided on said operating members and said pendulum adapted for interlocking engagement to secure said operating members against movement to close the valve element, when the pendulum is in its normal position.

20. A safety closure according to claim 19, wherein each operating member is provided with an elongated recess having an abutment element therein, and opposed pins on said pendulum received in said recesses and normally aligned with said abutment elements, thereby to prevent pivotal movement of said operating members to close the valve element, when the pendulum is in its normal position relative to said valve element.

References Cited in the file of this patent

UNITED STATES PATENTS

| Number | Name | Date |
|---|---|---|
| 1,393,825 | Porharty | Oct. 18, 1921 |
| 1,486,985 | Monahan | Mar. 18, 1924 |
| 2,086,969 | Strelow | July 13, 1937 |
| 2,089,640 | Cotterman | Aug. 10, 1937 |